(12) United States Patent
Kubota et al.

(10) Patent No.: US 9,291,801 B2
(45) Date of Patent: Mar. 22, 2016

(54) IMAGING LENS

(71) Applicants: OPTICAL LOGIC INC., Nagano (JP); KANTATSU CO., LTD., Tochigi (JP)

(72) Inventors: Yoji Kubota, Nagano (JP); Kenichi Kubota, Nagano (JP); Hitoshi Hirano, Nagano (JP); Tomohiro Yonezawa, Tochigi (JP)

(73) Assignees: OPTICAL LOGIC INC., Nagano (JP); KANTATSU CO., LTD, Tochigi (JP)

( * ) Notice: Subject to any disclaimer, the term of this patent is extended or adjusted under 35 U.S.C. 154(b) by 61 days.

(21) Appl. No.: 14/183,676

(22) Filed: Feb. 19, 2014

(65) Prior Publication Data

US 2014/0240853 A1 Aug. 28, 2014

(30) Foreign Application Priority Data

Feb. 28, 2013 (JP) .................................. 2013-038345

(51) Int. Cl.
*G02B 13/18* (2006.01)
*G02B 15/173* (2006.01)

(52) U.S. Cl.
CPC .............. *G02B 13/18* (2013.01); *G02B 15/173* (2013.01)

(58) Field of Classification Search
CPC .. G02B 13/18; G02B 13/002; G02B 13/0045; G02B 15/173; G02B 9/60; G02B 15/161
USPC .......................................... 359/714, 763, 764
See application file for complete search history.

(56) References Cited

U.S. PATENT DOCUMENTS

| 7,869,144 B2 * | 1/2011 | Heu | ............................. 359/794 |
| 2012/0257287 A1 * | 10/2012 | Huang | .......................... 359/714 |

FOREIGN PATENT DOCUMENTS

JP 2011-107593 A 6/2011

* cited by examiner

*Primary Examiner* — Scott J Sugarman
*Assistant Examiner* — Ibrahima Diedhiou
(74) *Attorney, Agent, or Firm* — Kubotera & Associates LLC

(57) ABSTRACT

An imaging lens includes an object-side lens group having positive refractive power; an aperture stop; and an image plane-side lens group having positive refractive power, arranged in this order from an object side to an image plane side. The object-side lens group includes a first lens having positive refractive power; a second lens having negative refractive power; and a third lens having positive refractive power. The image plane-side lens group includes a fourth lens having positive refractive power; and a fifth lens having negative refractive power. The first lens has an aspheric shape to have negative refractive power increasing toward a lens periphery from an optical axis, and has a surface on the object side having a positive curvature radius. The first to third lenses have specific focal lengths to satisfy specific conditions. The first to fifth lenses have specific Abbe's numbers to satisfy specific conditions.

16 Claims, 15 Drawing Sheets

IMAGING LENS

BACKGROUND OF THE INVENTION AND RELATED ART STATEMENT

The present invention relates to an imaging lens for forming an image of an object on an imaging element such as a CCD sensor and a CMOS sensor, and particularly, it relates to an imaging lens suitable for mounting in a relatively small camera such as a cellular phone, a digital still camera, a portable information terminal, a security camera, a vehicle onboard camera, and a network camera.

In these years, there have been available some vehicles equipped with a plurality of cameras for a purpose of enhancing convenience and security. For example, in case of a vehicle equipped with a backup camera to take an image behind the vehicle, a driver can see the rear view of the vehicle on a monitor upon backing up the vehicle. Accordingly, the driver can safely move the vehicle backward without hitting an object even if such an object is in a shadow of the vehicle and not visible from the driver. Such a camera mounted on a vehicle, i.e., a so-called onboard camera, is expected to be continuously on demand.

Normally, an onboard camera is often accommodated in a relatively small space such as in a backdoor of the vehicle, a front grill, a side mirror, and inside of the vehicle. For this reason, an imaging lens to be mounted in such an onboard camera is required to have compatibility to high resolution resulting from a high-pixel density imaging element and to have a wide angle to be compatible with a wide imaging range, as well as a small size. However, it is difficult to attain a small size and compatibility with high resolution while satisfactorily correcting aberrations, and further attain a wide imaging angle. For example, when a size of an imaging lens is reduced, refractive power of each lens tends to become stronger, so that it is difficult to satisfactorily correct aberrations thereof. Therefore, upon actually designing the imaging lens, it is important to satisfy those demands in a balanced manner.

As an imaging lens that has a wide imaging angle, for example, there is known an imaging lens described in Patent Reference. The imaging lens includes a first lens that has a shape of a meniscus lens directing a convex surface thereof to an object side and is negative; a second lens having a biconcave shape; a third lens having biconvex shape; an aperture stop; a fourth lens having a biconvex shape; and a fifth lens that has a shape of a meniscus lens directing a concave surface thereof to the object side and is negative, arranged in the order from the object side.

According to the imaging lens disclosed in Patent Reference, the third lens and the fourth lens in the configuration are formed of high-dispersion materials. Accordingly, it is possible to correct the field curvature and the chromatic aberration of magnification. Further, the second lens is formed in a shape so as to be a biconcave lens near the optical axis thereof, so that the second lens has strong negative refractive power. Accordingly, it is possible to attain a wide angle.
Patent Reference Japanese Patent Application Publication No. 2011-107593

According to the imaging lens described in Patent Reference, it is achievable to have a wide angle in spite of a small number of lenses that is as small as five, and also to relatively satisfactorily correct aberrations. However, since a total length of the whole lens system tends to be long relative to a focal length. Accordingly, it is difficult to satisfy the recent demands for downsizing and there is a limit by itself to balance between the downsizing of the imaging lens and satisfactory aberration correction. Here, such an issue is not specific to the imaging lens to be mounted in the onboard camera, but it is rather a common problem for the imaging lens to be mounted in a relatively small camera such as cellular phones, digital still cameras, portable information terminals, security cameras, and network cameras.

In view of the above-described problems in conventional techniques, an object of the present invention is to provide an imaging lens that can attain a wide angle in spite of the small size thereof and can satisfactorily correct aberrations.

Further objects and advantages of the present invention will be apparent from the following description of the present invention.

SUMMARY OF THE INVENTION

In order to attain the objects described above, according to a first aspect of the invention, an imaging lens includes an object-side lens group having positive refractive power; an aperture stop; and an image plane-side lens group having positive refractive power, arranged in this order from an object side to an image plane side. The object-side lens group includes a first lens having positive refractive power; a second lens having negative refractive power; and a third lens having positive refractive power. The image plane-side lens group includes a fourth lens having positive refractive power; and a fifth lens having negative refractive power. Further, the first lens is formed in an aspheric shape so as to have strong negative refractive power toward a lens periphery thereof from an optical axis thereof, and has an object-side surface having a positive curvature radius.

According to the first aspect of the present invention, when the first lens has a focal length f1, the second lens has a focal length f2, the third lens has a focal length f3, the first lens has an Abbe's number vd1, the second lens has an Abbe's number vd2, the third lens has an Abbe's number vd3, the fourth lens has an Abbe's number vd4, and the fifth lens has an Abbe's number vd5, the imaging lens satisfies the following conditional expressions (1) through (6).

$$|f2|<f1 \text{ and } |f2|<f3 \tag{1}$$

$$40<vd1<70 \tag{2}$$

$$40<vd2<70 \tag{3}$$

$$40<vd3<70 \tag{4}$$

$$40<vd4<70 \tag{5}$$

$$20<vd5<35 \tag{6}$$

Typically, as the first lens, which is to be disposed most closely to the object side in a wide-angle imaging lens, a meniscus lens is frequently used, which directs a convex surface thereof to the object side. The refractive power and the lens shape of the first lens are advantageous in terms of attaining a wide angle of the imaging lens, and are frequently applied in a wide-angle imaging lens including the one for mounting in an onboard camera. On the other hand, however, when the first lens is formed to have such refractive power and the lens shape, the first lens has relatively strong refractive power, so that the shape of a concave surface thereof on the image plane side becomes close to a semispherical shape. Accordingly, it easily causes a low yield in production, and it is difficult to properly form a coating such as in antireflection coating at the periphery of the concave surface. This issue is one of the causes for increased manufacturing cost of a wide-angle imaging lens.

To this end, according to the first aspect of the present invention, in the imaging lens, the object-side lens group, which is to be disposed on the object side relative to the aperture stop, includes the first lens having positive refractive power; the second lens having negative refractive power; and the third lens having positive refractive power, so as to have "positive-negative-positive" refractive power arrangement. Because of this refractive power arrangement, the positive refractive power of the object-side lens group is shared between the two lenses, i.e., the first lens and the third lens. In addition, as indicated in the conditional expression (1), both the first lens and the third lens have weaker refractive power than the second lens. Accordingly, the shape of the image plane-side surface of the first lens is away from a semispherical shape. Therefore, it is also achievable to properly apply a coating such as an antireflection coating, and to suitably attain reduction in the manufacturing cost of the imaging lens.

Furthermore, the first lens of the imaging lens of the invention is formed in the shape, such that the object-side surface thereof has the positive curvature radius and so as to have the aspheric surface having strong negative refractive power toward the lens periphery thereof from the optical axis thereof. When the first lens is formed in such a shape, it is achievable to take light beams in an even wider range and to suitably attain a wide angle of view of the imaging lens.

Generally speaking, in case of the wide-angle imaging lens of this type, it is known that it is difficult to correct aberrations as the angle of view is widened, i.e., the angle is wider. This is because it is difficult to satisfactorily correct aberrations such as a distortion, a field curvature, an astigmatism, and a chromatic aberration of magnification from a center part of the wide angle of view to the periphery.

According to the first aspect of the invention, as described above, in the imaging lens, the refractive power arrangement of the object-side lens group is positive-negative-positive, which is symmetrical around the second lens. Accordingly, it is achievable to satisfactorily correct aberrations including a chromatic aberration.

Moreover, in the conventional imaging lens of this type, it is typical to configure such that a lens having positive refractive power has a small Abbe's number and a lens having negative refractive power has a large Abbe's number in a lens group disposed on the object side relative to the aperture stop. Further, in a lens group disposed on the image plane side relative to the aperture stop, it is configured such that a lens having positive refractive power has a large Abbe's number and a lens having negative refractive power has a small Abbe's number. In the conventional imaging lens, an axial chromatic aberration and a chromatic aberration of magnification are satisfactorily corrected with such a combination of the refractive powers and the Abbe's numbers. However, in the conventional lens configuration, the chromatic aberration of magnification (especially a chromatic aberration at a short wavelength relative to a reference wavelength) is not often a linear change, thereby making it difficult to satisfactorily correct chromatic aberration.

According to the first aspect of the present invention, as shown in the conditional expressions (2) through (5), in the imaging lens, each of the first lens through the fourth lens is made of the material having the Abbe's number between 40 and 70, and the fifth lens is made of the material having the Abbe's number between 20 and 35 as shown in the conditional expression (6). Since the Abbe's numbers are restrained within the same range as described above, according to the imaging lens of the invention, it is possible to easily correct the chromatic aberration of magnification, and it is achievable to obtain satisfactory image-forming performance. In addition, since four of the five lenses that compose the imaging lens are made of the low-dispersion material, the chromatic aberration itself generated by those four lenses is satisfactorily restrained, and the chromatic aberration of the whole lens system is suitably restrained within the satisfactory range.

When the value exceeds the upper limit of "70" in the conditional expressions (2) to (5), although it is advantageous for correcting of the axial chromatic aberration, the chromatic aberration of magnification is excessively corrected, and it is difficult to attain satisfactory chromatic aberration correction. Moreover, the cost of the lens materials increases and it is difficult to restrain the manufacturing cost of the imaging lens. On the other hand, when the value is below the lower limit of "40", the axial chromatic aberration is insufficiently corrected and also in this case, it is difficult to satisfactorily correct the chromatic aberration.

Furthermore, according to the conditional expressions (5) and (6), the fourth lens and the fifth lens, which compose the image plane-side lens group, is a combination of the low dispersion material and the high dispersion material. Aberrations not corrected by the object-side lens group are more satisfactorily corrected by those two lenses. Especially, the chromatic aberration, which is an issue upon improving resolution of the imaging lens, is satisfactorily corrected with the fourth lens and the fifth lens. It is also possible to join the fourth lens and the fifth lens as one bonded lens.

Further, when the imaging lens satisfies the conditional expression (6), it is possible to satisfactorily correct the chromatic aberration. When the value exceeds the upper limit of "35", the axial chromatic aberration and the chromatic aberration of magnification are both insufficiently corrected, and it is difficult to satisfactorily correct the chromatic aberrations. On the other hand, when the value is below the lower limit of "20", the axial chromatic aberration and the chromatic aberration of magnification are excessively corrected and it is difficult to satisfactorily correct the chromatic aberration.

According to a second aspect of the present invention, in the imaging lens having the above-described configuration, the second lens may be formed in an aspheric shape having strong refractive power from the optical axis thereof toward the lens periphery thereof. Further, the second lens may have an image plane-side surface having a positive curvature radius, and the third lens may have an object-side surface and an image plane-side surface having negative curvature radii.

With the shape having strong negative refractive power at the lens periphery as the shape of the second lens, it is achievable to more effectively attain a wide angle in the imaging lens. In addition, forming the third lens, which has positive refractive power, in the shape so as to have the object-side surface and the image plane-side surface, curvature radii of which are both negative, i.e., a shape of a meniscus lens directing a concave surface to the object side near the optical axis, it is possible to satisfactorily correct the aberrations generated with a wide angle of the imaging lens, such as a distortion, a field curvature, an astigmatism, and a chromatic aberration of magnification, from the center part of the image to the periphery.

According to the second aspect of the present invention, the second lens and the third lens are disposed directing their concave surfaces to each other. Accordingly, the field curvature is also satisfactorily corrected. Moreover, since the third lens has the shape that directs the convex surface thereof to the image plane side, the distortion and chromatic aberration of magnification are also satisfactorily corrected.

According to a third aspect of the present invention, in the imaging lens having the above-described configuration, as the configuration of the image plane-side lens group, for example, the fourth lens may have an object-side surface having a positive curvature radius, and an image plane-side surface having a negative curvature radius. Further, the fifth lens may have an object-side surface and an image plane-side surface having negative curvature radii.

According to a fourth aspect of the present invention, in the imaging lens having the above-described configuration, when the whole lens system has a focal length f, the imaging lens preferably satisfies the following conditional expression (7):

$$1.5 < f1/f < 7 \qquad (7)$$

When the imaging lens satisfies the conditional expression (7), it is achievable to restrain a field curvature and a distortion within preferred ranges while downsizing of the imaging lens. Furthermore, when the imaging lens satisfies the conditional expression (7), it is also possible to satisfactorily correct the chromatic aberrations. When the value exceeds the upper limit of "7", the first lens has weak refractive power relative to the whole lens system, and the back focal length is long. Accordingly, it is difficult to downsize the imaging lens. In addition, since negative distortion increases, it is difficult to obtain satisfactory image-forming performance.

On the other hand, when the value is below the lower limit of "1.5", although it is advantageous for downsizing of the imaging lens and satisfactory correction of the distortion, the image-forming surface tends to curve to the objet side. In addition, the axial chromatic aberration is insufficiently corrected (a focal position at a short wavelength moves to the object side relative to a focal position at a reference wavelength) and the chromatic aberration of magnification is excessively corrected (an image-forming point at a short wavelength moves in a direction to be away from the optical axis relative to an image-forming point at a reference wavelength). Accordingly, it is difficult to obtain satisfactory image-forming performance.

According to a fifth aspect of the present invention, the imaging lens having the above-described configuration may be preferably configured to satisfy the following conditional expression (8):

$$2 < |f1/f2| < 8 \qquad (8)$$

When the imaging lens satisfies the conditional expression (8), it is achievable to satisfactorily correct the astigmatism and the chromatic aberration and restrain an incident angle of a light beam emitted from the imaging lens to the imaging element. As well known, an imaging element of a CCD sensor, CMOS sensor, or the like, has a predetermined so-called "chief ray angle (CRA)", that is a range of incident angles of light beams that can be taken in the sensor. Through restraining the incident angle of the light beam emitted from the imaging lens to the image plane within the CRA range, it is possible to suitably restrain generation of a shading phenomenon, i.e., a phenomenon of having dark periphery in an image.

When the value exceeds the upper limit of "8" in the conditional expression (8), an entrance pupil moves to the object side. Accordingly, although it is easy to restrain the incident angle of the light beam emitted from the imaging lens to the imaging element, the back focal length becomes long and it is difficult to attain downsizing of the imaging lens. In addition, the chromatic aberration of magnification is insufficiently corrected (an image-forming point at a short wavelength moves in a direction to be close to the optical axis relative to the image-forming point at a reference wavelength), and a sagittal image surface of the astigmatism curves to the positive direction (image plane side), and thereby the astigmatic difference increases. Therefore, it is difficult to obtain the satisfactory image-forming performance.

On the other hand, when the value is below the lower limit of "2", the entrance pupil moves to the image plane side, and the back focal length is short. Accordingly, although it is advantageous for downsizing of the imaging lens, it is difficult to ensure a space for disposing an insert such as infrared cutoff filter and it is difficult to restrain the incident angle of the light beam emitted from the imaging lens to the imaging element. In addition, among the astigmatism, the sagittal image surface curves in a negative direction (to the object side). Accordingly, the axial chromatic aberration and chromatic aberration of magnification are insufficiently corrected, so that it is difficult to obtain satisfactory image-forming performance.

According to a sixth aspect of the present invention, when the whole lens system has a focal length f, and the focal length of the object-side lens group is Ff, the imaging lens having the above-described configuration may be preferably configured to satisfy the following conditional expression (9):

$$5 < Ff/f < 12 \qquad (9)$$

When the imaging lens satisfies the conditional expression (9), it is achievable to restrain the distortion, the chromatic aberration, and the astigmatism within preferred ranges while attaining downsizing of the imaging lens. When the value exceeds the upper limit of "12", although it is advantageous for correction of the distortion and the axial chromatic aberration, the astigmatic difference tends to increase. Further, the chromatic aberration of magnification is insufficiently corrected, and it is difficult to obtain satisfactory image-forming performance.

On the other hand, when the value is below the lower limit of "5", the refractive power of positive lens in the object-side lens group is strong relative to the whole lens system. Accordingly, although it is advantageous for downsizing of the imaging lens, the axial chromatic aberration is insufficiently corrected and the chromatic aberration of magnification is excessively corrected. Therefore, it is difficult to obtain the satisfactory image-forming performance. Further, when the refractive power of the image plane-side lens group is increased to maintain the focal length of the whole lens system by an increment in reflective power of the object-side lens group, the negative distortion increases, and also in this case, it is difficult to obtain the satisfactory image-forming performance.

According to a seventh aspect of the present invention, when the whole lens system has a focal length f and the image plane-side lens group has a focal length Fr, the imaging lens having the above-described configuration may be preferably configured to satisfy the following conditional expression (10):

$$0.5 < Fr/f < 2.5 \qquad (10)$$

When the imaging lens satisfies the conditional expression (10), it is achievable to satisfactorily correct the chromatic aberration and the field curvature, while restraining the incident angle of a light beam emitted from the imaging lens to the imaging element. When the value exceeds the upper limit of "2.5", although it is easy to restrain the curve of the image-forming surface, it is difficult to restrain the incident angle of the light beam emitted from the imaging lens to the imaging element. In addition, the axial chromatic aberration is insufficiently corrected and it is difficult to obtain satisfactory image-forming performance.

On the other hand, when the value is below the lower limit of "0.5", although it is advantageous for correction of the axial chromatic aberration and the chromatic aberration of magnification, the image-forming surface curves to the object side from the image center part to the periphery, which is so-called insufficient correction state. Accordingly, it is difficult to obtain the satisfactory image-forming performance.

According to the present invention, the imaging lens is especially effective for an imaging lens that requires an angle of view of at least 130° (130°≤2ω).

According to the present invention, in the imaging lens, it is achievable to obtain both a wide angle of the imaging lens and the aberration correction, and thereby it is possible to provide the small-sized imaging lens with the satisfactorily corrected aberrations.

DETAILED DESCRIPTION OF PREFERRED EMBODIMENTS

Hereunder, referring to the accompanying drawings, embodiments of the present invention will be fully described.

FIGS. 1, 4, 7, 10, and 13 are schematic sectional views of imaging lenses in Numerical Data Examples 1 to 5 according to the embodiment, respectively. Since a basic lens configuration is the same among those Numerical Data Examples, the lens configuration of the embodiment will be described with reference to the illustrative sectional view of Numerical Data Example 1.

Figure 1:
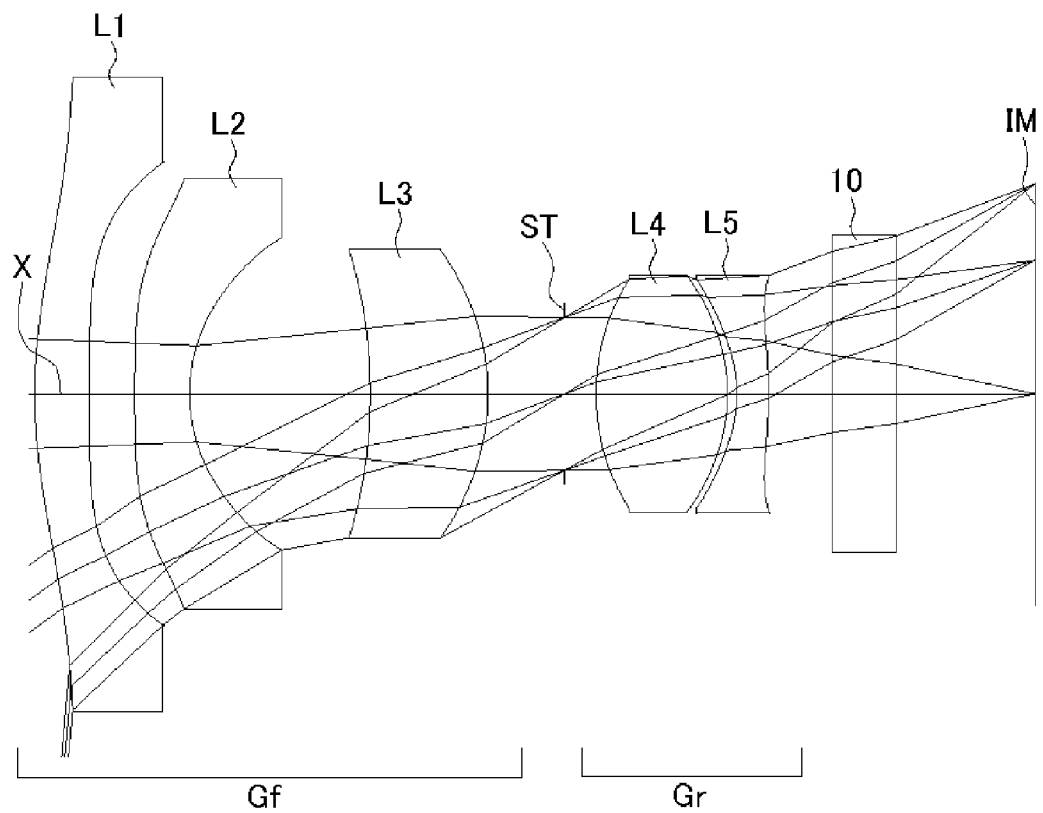
FIG. 1 shows a sectional view of a schematic configuration of an imaging lens in Numerical Data Example 1 according to an embodiment of the invention.

As shown in FIG. 1, the imaging lens of the embodiment includes an object-side lens group Gf having positive refractive power; an aperture stop ST; an image plane-side lens group Gr having positive refractive power, arranged in the order from the object side to the image plane side. More specifically, the imaging lens of the embodiment includes the object-side lens group Gf, which is disposed on the object side relative to the aperture stop ST, and the image plane-side lens group Gr, which is disposed on the image plane side relative to the aperture stop ST, such that the object-side lens group Gf and the image plane-side lens group Gr are disposed across the aperture stop ST, being both configured to have positive refractive power.

The object-side lens group Gf and the image plane-side lens group Gr are configured to satisfy the following conditional expressions:

$$5 < Ff/f < 12$$

$$0.5 < Fr/f < 2.5$$

In the above conditional expressions,
f: Focal length of the whole lens system
Ff: Focal length of the object-side lens group Gf
Fr: Focal length of the image plane-side lens group Gr Among them, the object-side lens group Gf includes a first lens L1 having positive refractive power; a second lens L2 having negative refractive power; and a third lens L3 having positive refractive power, arranged in the order from the object side to the image plane side.

The first lens L1 is formed as an aspheric shape having strong negative refractive power as it goes from an optical axis X to lens periphery. According to the imaging lens of the embodiment, the refractive power of the first lens L1 is positive near the optical axis x and negative at the lens periphery. The first lens L1 is formed in a shape such that a curvature radius r1 of an object-side surface thereof is positive and a curvature radius r2 of an image plane-side surface thereof is negative, and so as to have a shape of biconvex lens near the optical axis x. Here, the shape of the first lens L1 is not limited to the one described above. The shape of the first lens L1 can be formed in a shape such that the curvature radius r1 and the curvature radius r2 are both positive, and so as to have a shape of a meniscus lens directing a convex surface thereof to the object side near the optical axis X. The Numerical Data Examples 1 and 2 are examples where the first lens L1 has a shape of biconvex lens near the optical axis x, and the Numerical Data Examples 3 to 5 are examples where the first lens L1 has a shape of meniscus lens directing a convex surface thereof to the object side near the optical axis X.

The second lens L2 is formed as an aspheric shape such that negative refractive power increases as it goes from the optical axis x to the lens periphery. In addition, the second lens L2 is formed in a shape such that a curvature radius r3 of an object-side surface thereof and a curvature radius r4 of an image plane-side surface thereof are both positive, and has a shape of a meniscus lens directing a convex surface thereof to the object side near the optical axis x. The image plane-side surface of the second lens L2 is an intense concave surface. Here, the shape of the second lens L2 is not limited to the one described above. The second lens L2 can be formed in a shape such that the curvature radius r3 is negative and the curvature radius r4 is positive, i.e. a shape of a biconcave lens near the optical axis x. Numerical Data Examples 1 to 3 and 5 are examples where the second lens L2 has a shape of a meniscus lens directing a convex surface thereof to the object side near the optical axis x, and Numerical Data Example 4 is an example where the second lens L2 has a shape of a biconcave lens near the optical axis x.

The first lens L1 and the second lens L2 satisfy the following conditional expressions:

1.5<f1/f<7

2<f1/|f2|<8

In the above conditional expressions,
f1: Focal length of the first lens L1
f2: Focal length of the second lens L2

The third lens L3 is formed in a shape such that a curvature radius r5 of an object-side surface thereof and a curvature radius r6 of an image plane-side surface thereof are both negative and so as to have a shape of a meniscus lens directing a concave surface thereof to the object side near the optical axis x. Accordingly, the second lens L2 and the third lens L3 are disposed while directing their concave surfaces to each other.

As described above, the object-side lens group Gf is composed of the three lenses, the first lens L1 to the third lens L3. The first lens L1 to the third lens L3 further satisfy the following conditional expressions:

|f2|<f1 and |f2|<f3

In order to satisfactorily correct aberrations while attaining a wide angle of the imaging lens, the balance between the refractive powers of the first lens L1 and the second lens L2 is important. As a result of optical simulations, as shown in the conditional expressions, it was found that, by having the refractive power of the second lens L2 two times the refractive power of the first lens L1 or larger, it is achievable to suitably obtain a wide angle of the imaging lens and satisfactory correction of aberrations. The first lens L1's having weak refractive power is effective also in view of reducing sensitivity to deterioration in image-forming performance (manufacture error sensitivity) to decentering (eccentricity), tilting, etc. occurred upon manufacturing of the imaging lens.

On the other hand, the fourth lens L4 that composes the image plane-side lens group Gr is formed in a shape such that a curvature radius r8 of an object-side surface thereof is positive and a curvature radius r9 of an image plane-side surface thereof is negative, and so as to have a shape of biconvex lens near the optical axis x. In addition, the fifth lens L5 is formed in a shape such that a curvature radius r10 of an object-side surface thereof and a curvature radius r11 of an image plane-side surface thereof are both negative, i.e. a shape of a meniscus lens directing a concave surface thereof to the object side near the optical axis x. Here, there may be provided a filter 10 between the fifth lens L5 and the image plane IM. The filter 10 may be also optionally omitted.

The first lens L1 to the fifth lens L5, which are fully described above, are made of materials that satisfy the following conditional expressions:

40<vd1<70

40<vd2<70

40<vd3<70

40<vd4<70

20<vd5<35

In the above conditional expressions,
vd1: Abbe's number of the first lens L1
vd2: Abbe's number of the second lens L2
vd3: Abbe's number of the third lens L3
vd4: Abbe's number of the fourth lens L4
vd5: Abbe's number of the fifth lens L5

For the lens materials, there are generally glass-based materials and plastic (resin)-based materials. In case of restraining fluctuation of focal lengths due to environmental temperatures or in case of use in severe environments, each lens is preferably made of a glass-based material. Especially, an onboard camera is often used under high-temperature conditions, and also required to be resistant against water and carwash damages, so glass-based materials are preferably used. However, glass-based materials are typically more expensive than plastic-based materials. For cellular phones and security cameras, plastic-based materials are frequently used for balance between the manufacturing cost and the optical performances.

For this reason, in order to further reduce the manufacturing cost of the imaging lens, the first lens L1 to the fourth lens L4 are preferably made from materials that satisfy the following conditional expressions:

50<vd1<60

50<vd2<60

50<vd3<60

50<vd4<60

Here, it is not necessary to satisfy all of the conditional expressions, and it is achievable to obtain an effect corresponding to the respective conditional expression when any single one of the conditional expressions is individually satisfied.

In the embodiment, all lens surfaces of the first lens L1 to the fifth lens L5 are formed as an aspheric surface. When the aspheric surfaces applied to the lens surfaces have an axis Z in a direction of the optical axis, a height H in a direction perpendicular to the optical axis, a conical coefficient k, and aspheric coefficients $A_4$ and $A_6$, a shape of the aspheric surfaces of the lens surfaces is expressed as follows:

$$Z = \frac{\frac{H^2}{R}}{1+\sqrt{1-(k+1)\frac{H^2}{R^2}}} + A_4 H^4 + A_6 H^6$$ [Formula 1]

Next, Numerical Data Examples of the imaging lens of the embodiment will be described. In each Numerical Data Example, f represents a focal length of the whole lens system, Fno represents an F number, and ω represents a half angle of view, respectively. In addition, i represents a surface number counted from the object side, r represents a curvature radius, d represents a distance between lens surfaces (surface spacing) on the optical axis, nd represents a refractive index for a d line, and vd represents Abbe's number for the d line, respectively. Here, aspheric surfaces are indicated with surface numbers i affixed with * (asterisk). In addition, a sum of surface spacing on the optical axis (length of the filter 10 is the length in air) from the object-side surface of the first lens L1 to the image plane IM is indicated as La.

Numerical Data Example 1

Basic data are shown below.
f = 2.87 mm, Fno = 2.4, ω = 85°
Unit: mm

Surface Data

| Surface Number i | r | d | nd | vd |
|---|---|---|---|---|
| (Object) | ∞ | ∞ | | |
| 1* | 5.927 | 0.600 | 1.535 | 56.1 (=vd1) |
| 2* | −372.607 | 0.496 | | |
| 3* | 96.016 | 0.600 | 1.535 | 56.1 (=vd2) |
| 4* | 1.854 | 1.979 | | |
| 5* | −6.174 | 1.293 | 1.535 | 56.1 (=vd3) |
| 6* | −2.498 | 0.840 | | |
| 7 (Stop) | ∞ | 0.346 | | |
| 8* | 2.512 | 1.442 | 1.535 | 56.1 (=vd4) |
| 9* | −1.879 | 0.100 | | |
| 10* | −1.553 | 0.348 | 1.614 | 26.0 (=vd5) |
| 11* | −5.309 | 0.700 | | |
| 12 | ∞ | 0.700 | 1.517 | 64.1 |
| 13 | ∞ | 1.523 | | |
| (Image plane) | ∞ | | | |

Ff = 23.96 mm
Fr = 4.43 mm
f1 = 10.91 mm
f2 = −3.54 mm
f3 = 6.98 mm
f4 = 2.27 mm
f5 = −3.70 mm
La = 10.73 mm

Aspheric Surface Data

First Surface
k = 0.000, $A_4$ = −6.713E−03, $A_6$ = 1.510E−04
Second Surface
k = 0.000, $A_4$ = 1.667E−02, $A_6$ = 4.431E−04
Third Surface
k = 0.000, $A_4$ = 3.703E−02, $A_6$ = −3.694E−03
Fourth Surface
k = 0.000, $A_4$ = 1.016E−02, $A_6$ = −8.772E−03
Fifth Surface
k = 0.000, $A_4$ = −6.026E−03, $A_6$ = 5.570E−04
Sixth Surface
k = 0.000, $A_4$ = 8.672E−03, $A_6$ = −8.222E−04
Eighth Surface
k = 0.000, $A_4$ = 1.542E−02, $A_6$ = −3.746E−03
Ninth Surface
k = 0.000, $A_4$ = 3.297E−02, $A_6$ = −4.211E−03
Tenth Surface
k = 0.000, $A_4$ = 6.873E−02, $A_6$ = 7.125E−03
Eleventh Surface
k = 0.000, $A_4$ = 3.874E−02, $A_6$ = 1.252E−02

The values of the respective conditional expressions are as follows:

$f1/f$=3.80

$|f1/f2|$=3.08

$Ff/f$=8.35

$Fr/f$=1.54

Accordingly, the imaging lens of Numerical Data Example 1 satisfies the above-described conditional expressions. A sum of surface spacing La on the optical axis from the object-side surface of the first lens L1 to the image plane IM is 10.73 mm, and downsizing of the imaging lens is attained.

Figure 2:
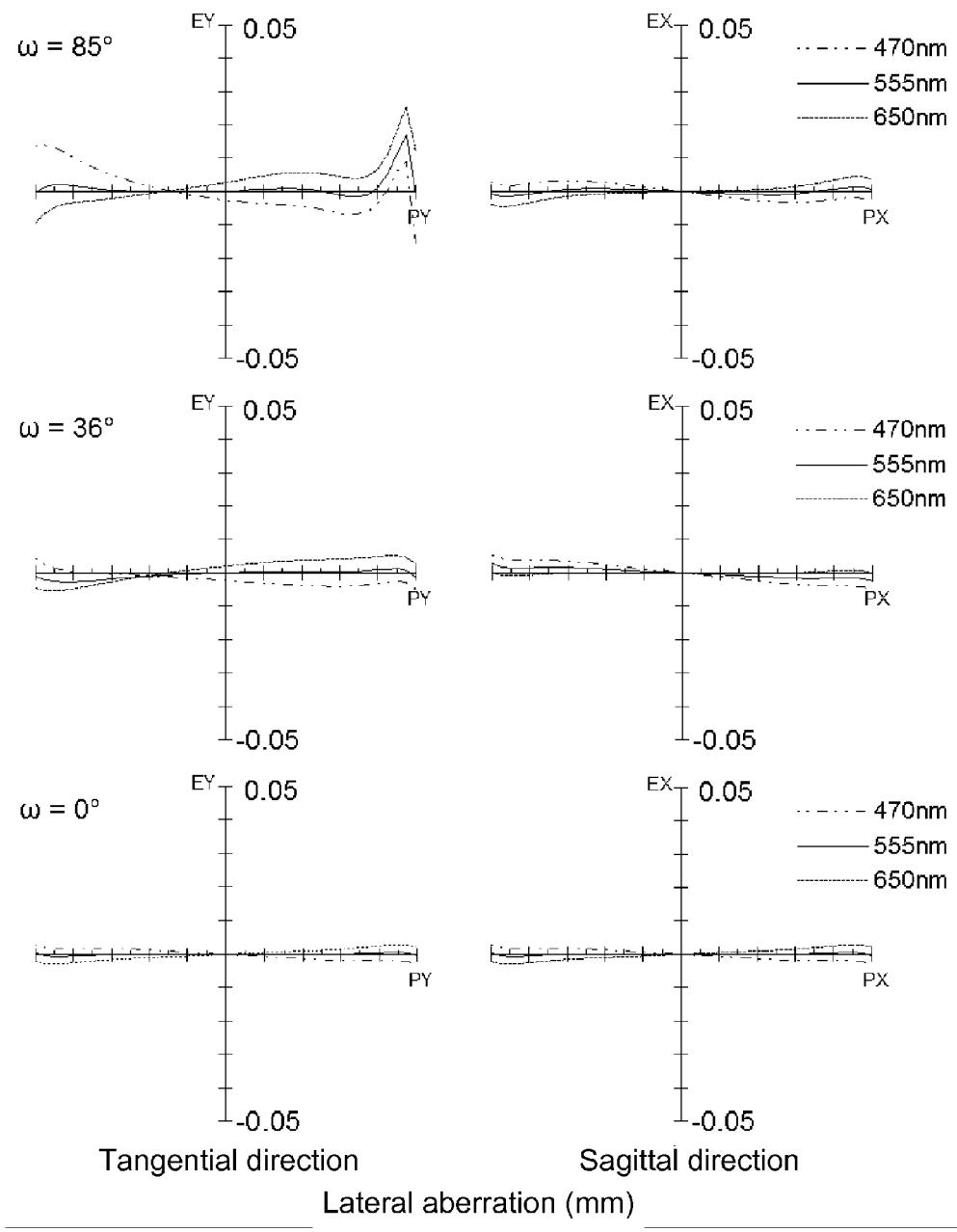
FIG. 2 is an aberration diagram showing a lateral aberration of the imaging lens of FIG. 1.
Figure 3:
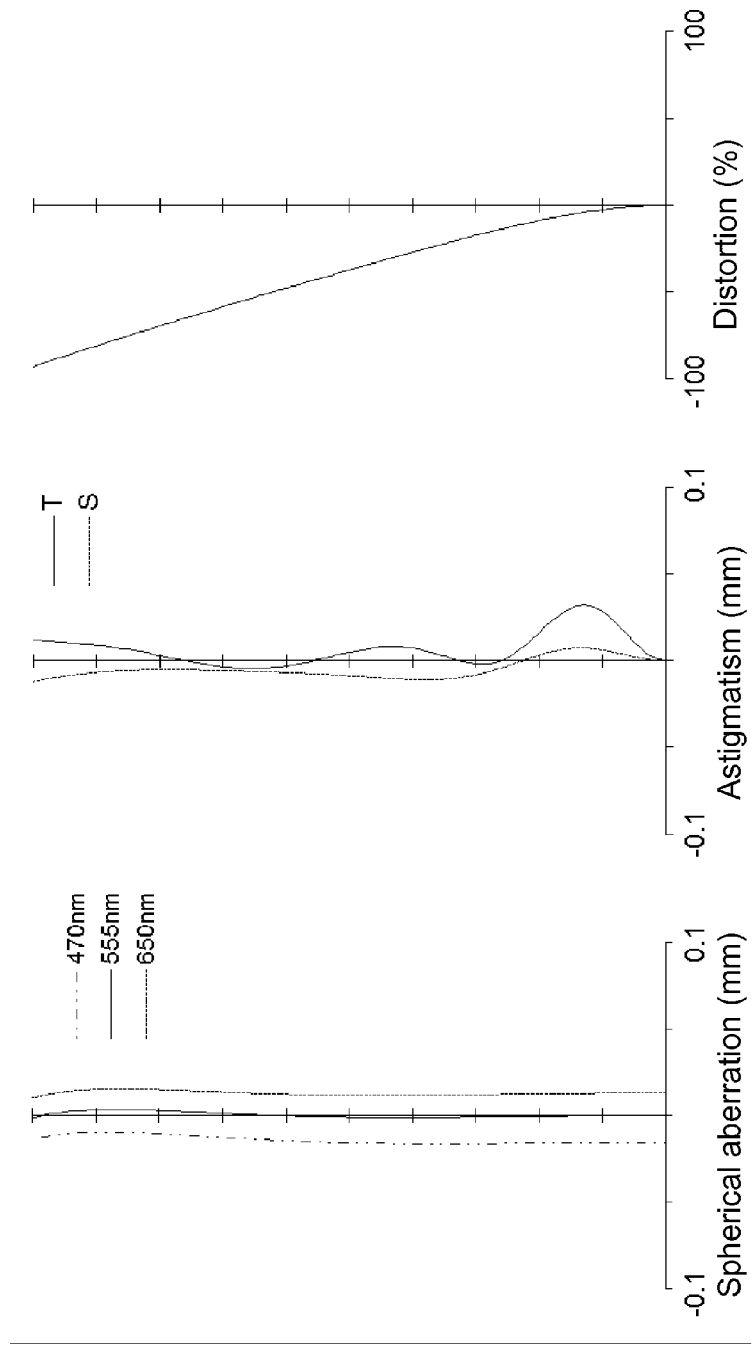
FIG. 3 is an aberration diagram showing a spherical aberration, astigmatism, and a distortion of the imaging lens of FIG. 1.
Figure 4:
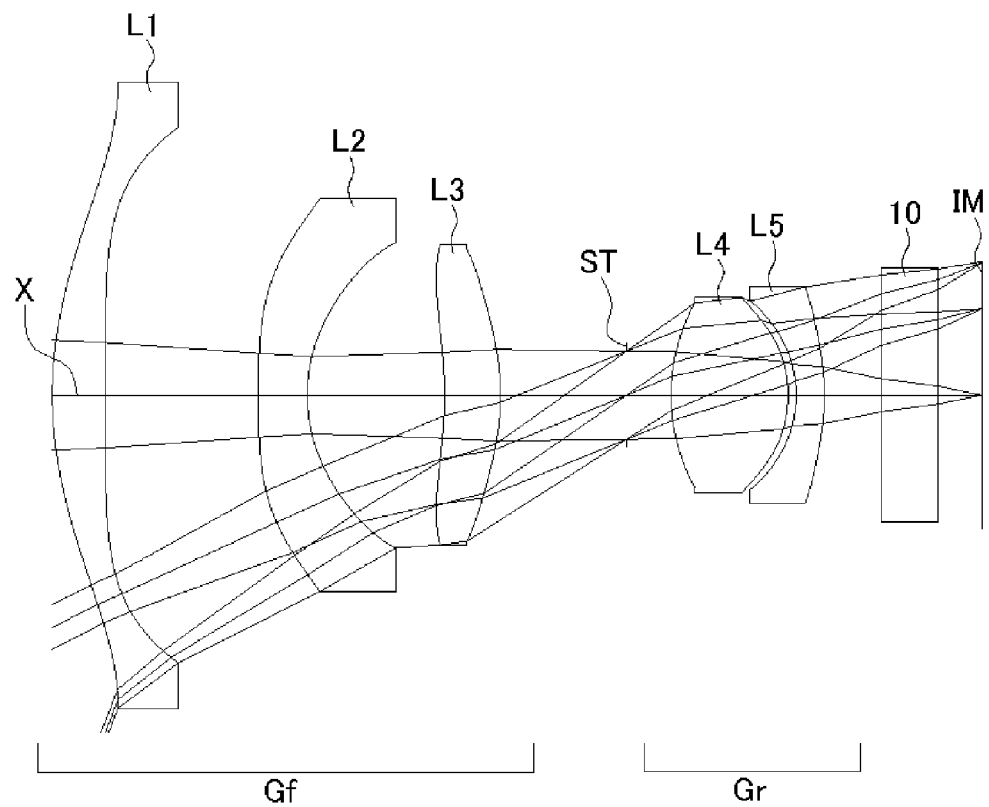
FIG. 4 shows a sectional view of a schematic configuration of an imaging lens in Numerical Data Example 2 according to the embodiment of the invention.

FIG. 2 shows a lateral aberration that corresponds to a half angle of view ω, which is divided into a tangential direction and a sagittal direction (which is the same in FIGS. 5, 8, 11, and 14) in the imaging lens of Numerical Data Example 1. Furthermore, FIG. 3 shows a spherical aberration (mm), astigmatism (mm), and a distortion (%), respectively in the imaging lens of Numerical Data Example 1. In the astigmatism diagram, S indicates an aberration on a sagittal image surface and T indicates an aberration on a tangential image surface, respectively (which are the same in FIGS. 6, 9, 12, and 15). As shown in FIGS. 2 and 3, according to the imaging lens of Numerical Data Example 1, the aberrations are satisfactorily corrected.

Numerical Data Example 2

Basic data are shown below.
f = 3.37 mm, Fno = 2.5, ω = 69°
Unit: mm

Surface Data

| Surface Number i | r | d | nd | vd |
|---|---|---|---|---|
| (Object) | ∞ | ∞ | | |
| 1* | 4.888 | 0.648 | 1.535 | 56.1 (=vd1) |
| 2* | −1042.209 | 1.877 | | |
| 3* | 15.994 | 0.600 | 1.535 | 56.1 (=vd2) |
| 4* | 1.995 | 1.682 | | |
| 5* | −5.093 | 0.690 | 1.535 | 56.1 (=vd3) |
| 6* | −2.844 | 1.544 | | |
| 7 (Stop) | ∞ | 0.544 | | |
| 8* | 2.200 | 1.434 | 1.535 | 56.1 (=vd4) |
| 9* | −1.585 | 0.100 | | |
| 10* | −1.454 | 0.346 | 1.614 | 26.0 (=vd5) |
| 11* | −2.775 | 0.700 | | |
| 12 | ∞ | 0.700 | 1.517 | 64.1 |
| 13 | ∞ | 0.556 | | |
| (Image plane) | ∞ | | | |

Ff = 40.27 mm
Fr = 2.86 mm
f1 = 9.10 mm
f2 = −4.32 mm
f3 = 10.87 mm
f4 = 1.98 mm
f5 = −5.53 mm
La = 11.18 mm

Aspheric Surface Data

First Surface
k = 0.000, $A_4$ = −3.257E−03, $A_6$ = −1.093E−04
Second Surface
k = 0.000, $A_4$ = 3.640E−03, $A_6$ = 3.788E−04
Third Surface
k = 0.000, $A_4$ = 3.108E−02, $A_6$ = −2.436E−03
Fourth Surface
k = 0.000, $A_4$ = −1.158E−03, $A_6$ = −4.964E−03
Fifth Surface
k = 0.000, $A_4$ = 2.471E−02, $A_6$ = 1.187E−04
Sixth Surface
k = 0.000, $A_4$ = 3.732E−02, $A_6$ = −4.911E−03
Eighth Surface
k = 0.000, $A_4$ = −2.744E−02, $A_6$ = 1.062E−02
Ninth Surface
k = 0.000, $A_4$ = −9.543E−02, $A_6$ = 5.957E−02
Tenth Surface
k = 0.000, $A_4$ = −1.093E−02, $A_6$ = 1.315E−02
Eleventh Surface
k = 0.000, $A_4$ = 6.936E−02, $A_6$ = −2.130E−02

The values of the respective conditional expressions are as follows:

$f1/f=2.70$ $|f1/f2|=2.11$ $Ff/f=11.95$ $Fr/f=0.85$

Accordingly, the imaging lens of Numerical Data Example 2 satisfies the above-described conditional expressions. A sum of surface spacing La on the optical axis from the object-side surface of the first lens L1 to the image plane IM is 11.18 mm, and downsizing of the imaging lens is attained.

Figure 5:
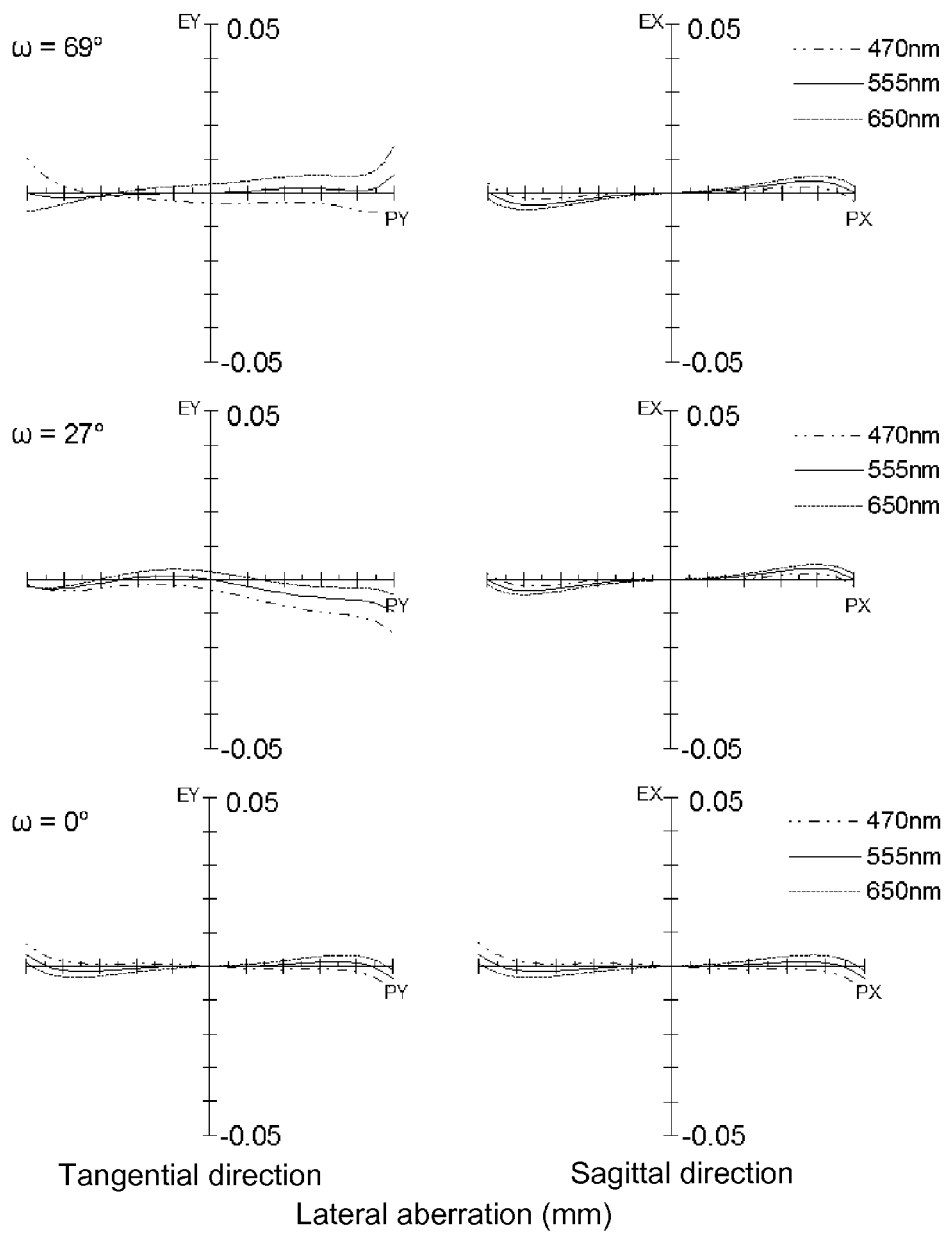
FIG. 5 is an aberration diagram showing a lateral aberration of the imaging lens of FIG. 4.
Figure 6:
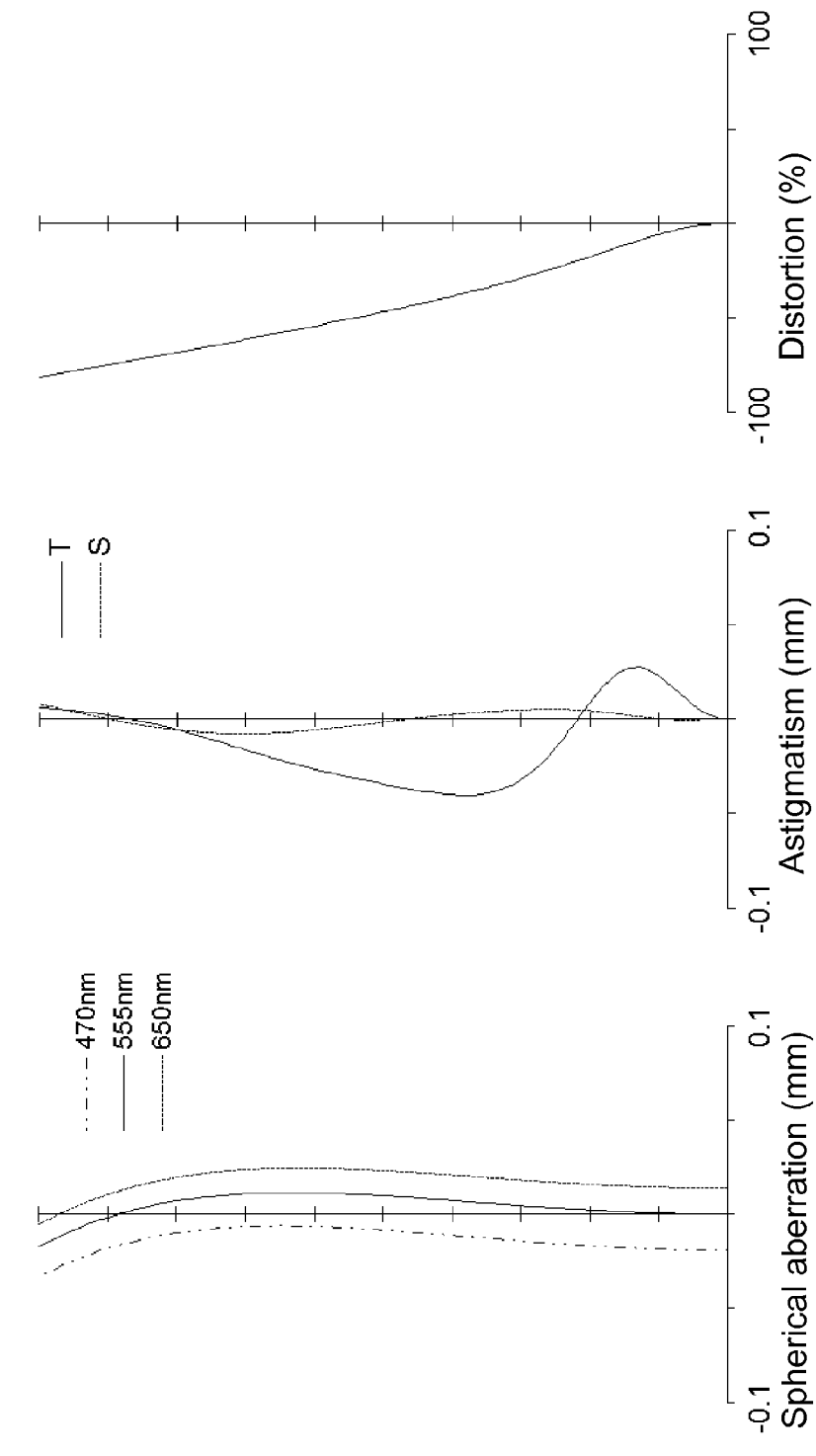
FIG. 6 is an aberration diagram showing a spherical aberration, astigmatism, and a distortion of the imaging lens of FIG. 4.
Figure 7:
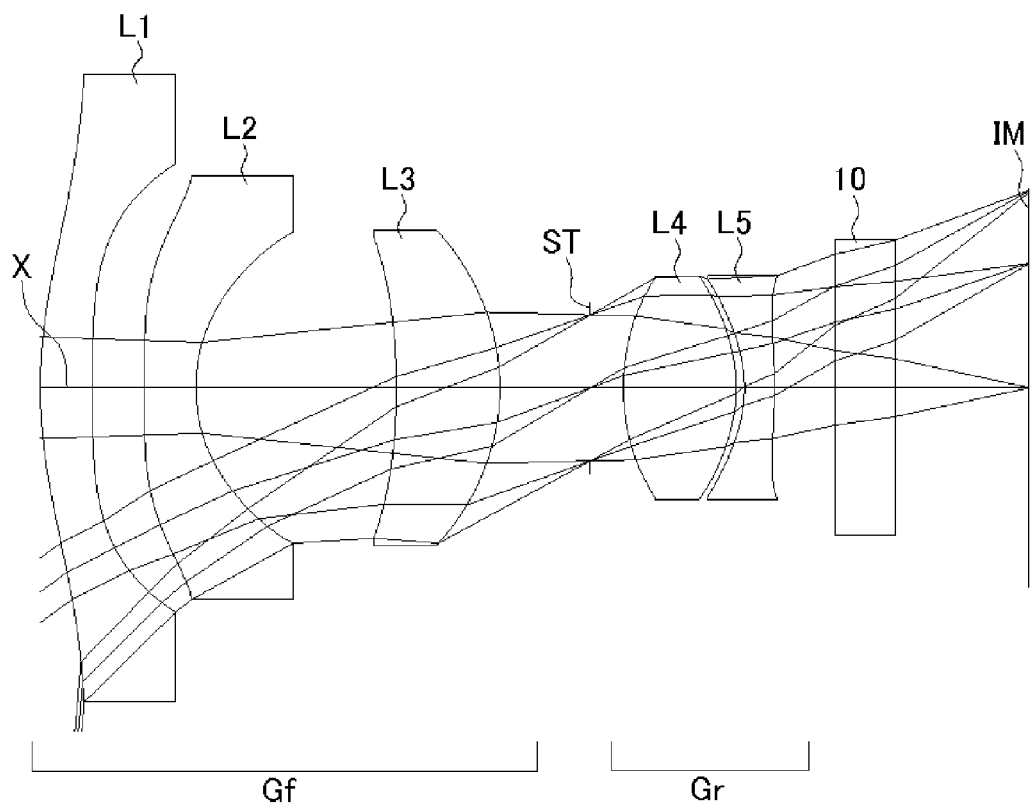
FIG. 7 shows a sectional view of a schematic configuration of an imaging lens in Numerical Data Example 3 according to the embodiment of the invention.

FIG. 5 shows a lateral aberration that corresponds to a half angle of view ω, and FIG. 6 shows a spherical aberration (mm), astigmatism (mm), and a distortion (%), respectively in the imaging lens of Numerical Data Example 2. As shown in FIGS. 5 and 6, according to the imaging lens of Numerical Data Example 2, the aberrations are also satisfactorily corrected.

Numerical Data Example 3

Basic data are shown below.
f = 2.84 mm, Fno = 2.4, ω = 85°
Unit: mm

Surface Data

| Surface Number i | r | d | nd | vd |
|---|---|---|---|---|
| (Object) | ∞ | ∞ | | |
| 1* | 5.498 | 0.600 | 1.535 | 56.1 (=vd1) |
| 2* | 22.066 | 0.606 | | |
| 3* | 100.433 | 0.600 | 1.535 | 56.1 (=vd2) |
| 4* | 1.948 | 2.326 | | |
| 5* | −7.794 | 1.205 | 1.535 | 56.1 (=vd3) |
| 6* | −2.488 | 1.051 | | |
| 7 (Stop) | ∞ | 0.381 | | |
| 8* | 2.571 | 1.308 | 1.535 | 56.1 (=vd4) |
| 9* | −1.929 | 0.100 | | |
| 10* | −1.596 | 0.346 | 1.614 | 26.0 (=vd5) |
| 11* | −6.276 | 0.700 | | |
| 12 | ∞ | 0.700 | 1.517 | 64.1 |
| 13 | ∞ | 1.552 | | |
| (Image plane) | ∞ | | | |

Ff = 15.69 mm
Fr = 4.77 mm
f1 = 13.52 mm
f2 = −3.72 mm
f3 = 6.33 mm
f4 = 2.29 mm
f5 = −3.58 mm
La = 11.24 mm

Aspheric Surface Data

First Surface
k = 0.000, $A_4$ = −6.442E−03, $A_6$ = 1.142E−04
Second Surface
k = 0.000, $A_4$ = 1.344E−02, $A_6$ = 6.217E−04
Third Surface
k = 0.000, $A_4$ = 3.626E−02, $A_6$ = −3.623E−03
Fourth Surface
k = 0.000, $A_4$ = 1.823E−02, $A_6$ = −8.231E−03
Fifth Surface
k = 0.000, $A_4$ = −7.997E−03, $A_6$ = 4.921E−04
Sixth Surface
k = 0.000, $A_4$ = 6.233E−03, $A_6$ = −1.225E−04

-continued

Basic data are shown below.
f = 2.84 mm, Fno = 2.4, ω = 85°
Unit: mm

Eighth Surface
k = 0.000, $A_4$ = 1.622E−02, $A_6$ = −3.214E−03
Ninth Surface
k = 0.000, $A_4$ = 3.151E−02, $A_6$ = −3.623E−03
Tenth Surface
k = 0.000, $A_4$ = 6.891E−02, $A_6$ = 4.085E−03
Eleventh Surface
k = 0.000, $A_4$ = 4.243E−02, $A_6$ = 1.005E−02

The values of the respective conditional expressions are as follows:

$f1/f=4.76$ $|f1/f2|=3.63$ $Ff/f=5.52$ $Fr/f=1.68$

Accordingly, the imaging lens of Numerical Data Example 3 satisfies the above-described conditional expressions. A sum of surface spacing La on the optical axis from the object-side surface of the first lens L1 to the image plane IM is 11.24 mm, and downsizing of the imaging lens is attained.

Figure 8:
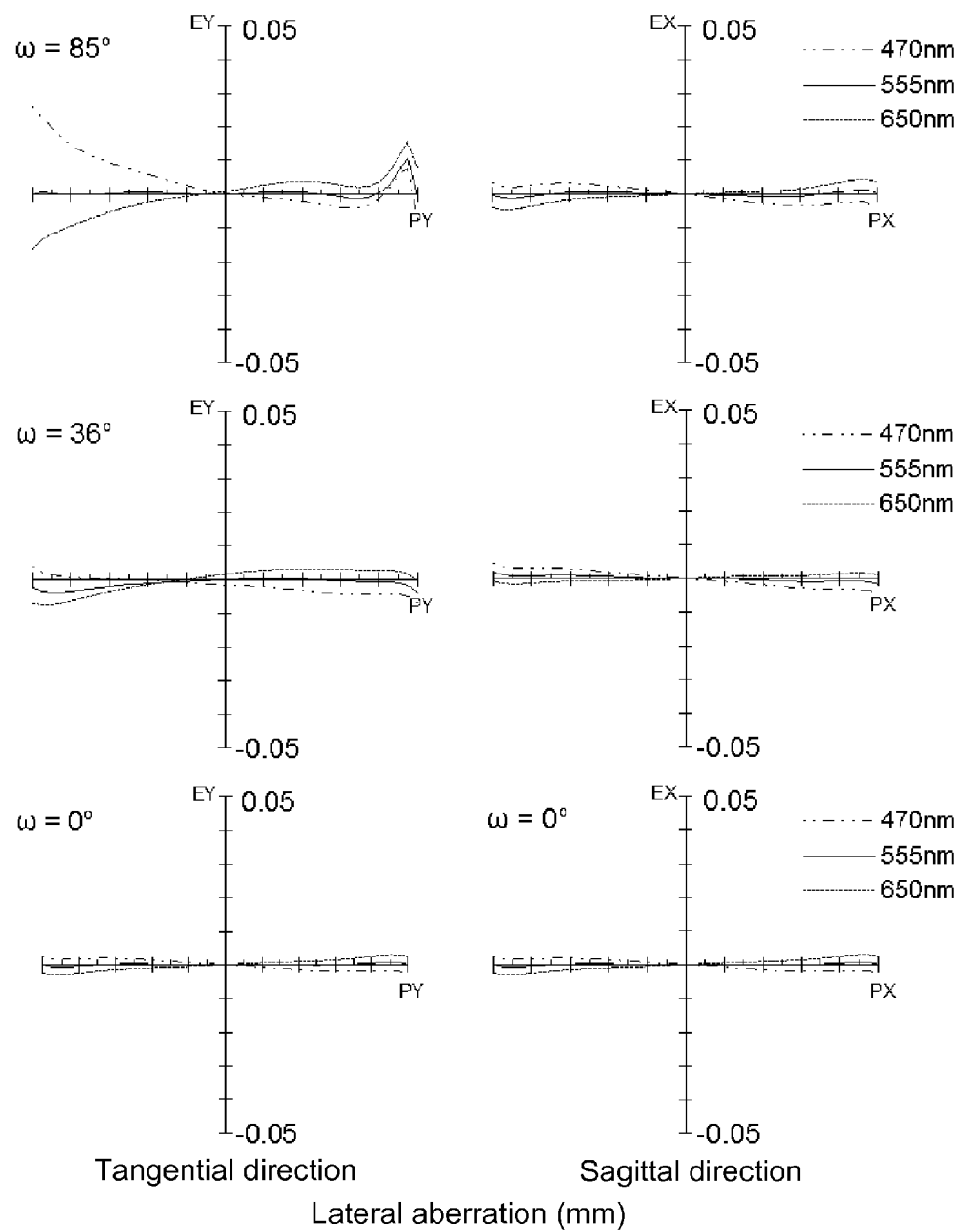
FIG. 8 is an aberration diagram showing a lateral aberration of the imaging lens of FIG. 7.
Figure 9:
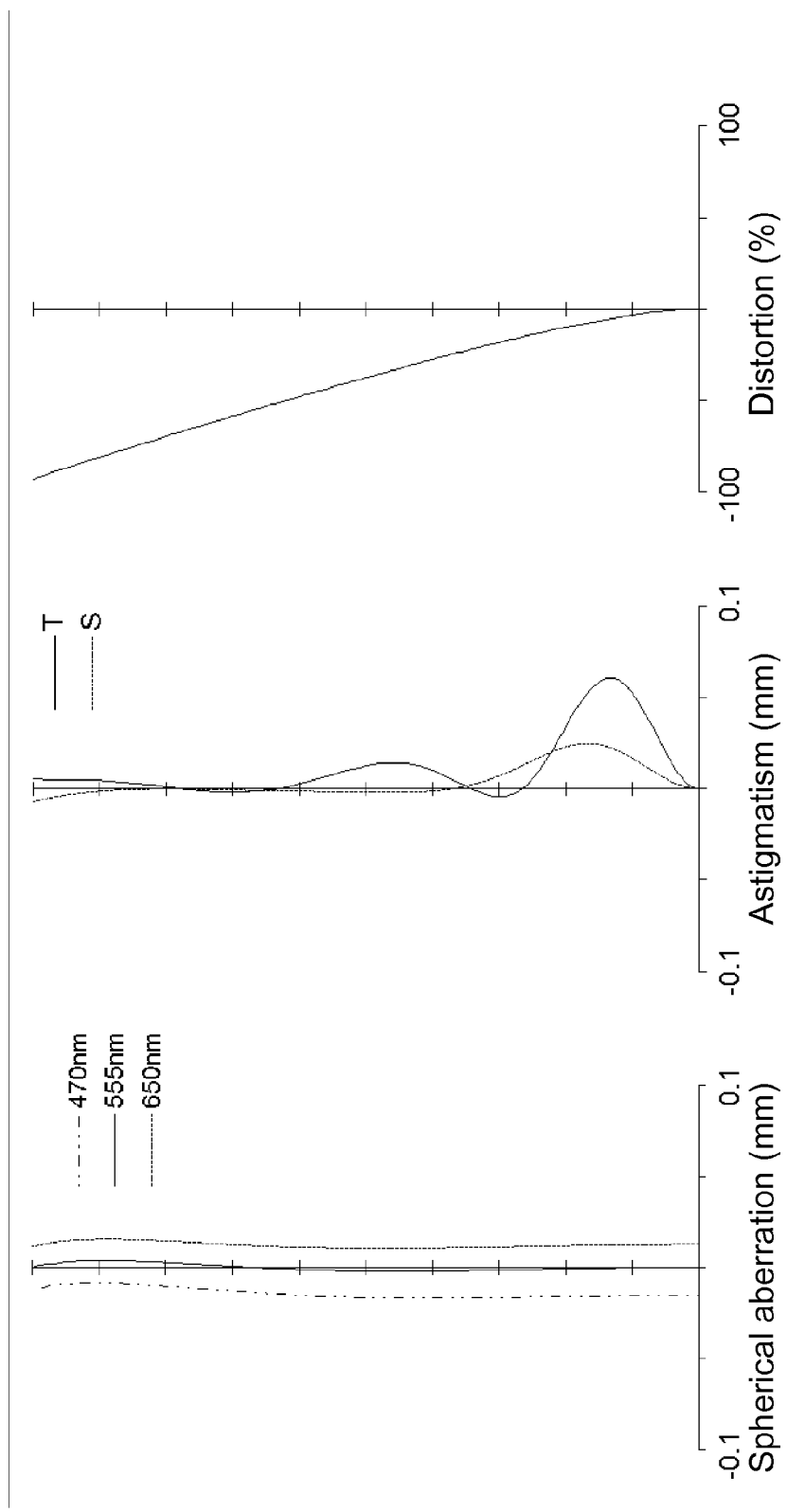
FIG. 9 is an aberration diagram showing a spherical aberration, astigmatism, and a distortion of the imaging lens of FIG. 7.
Figure 10:
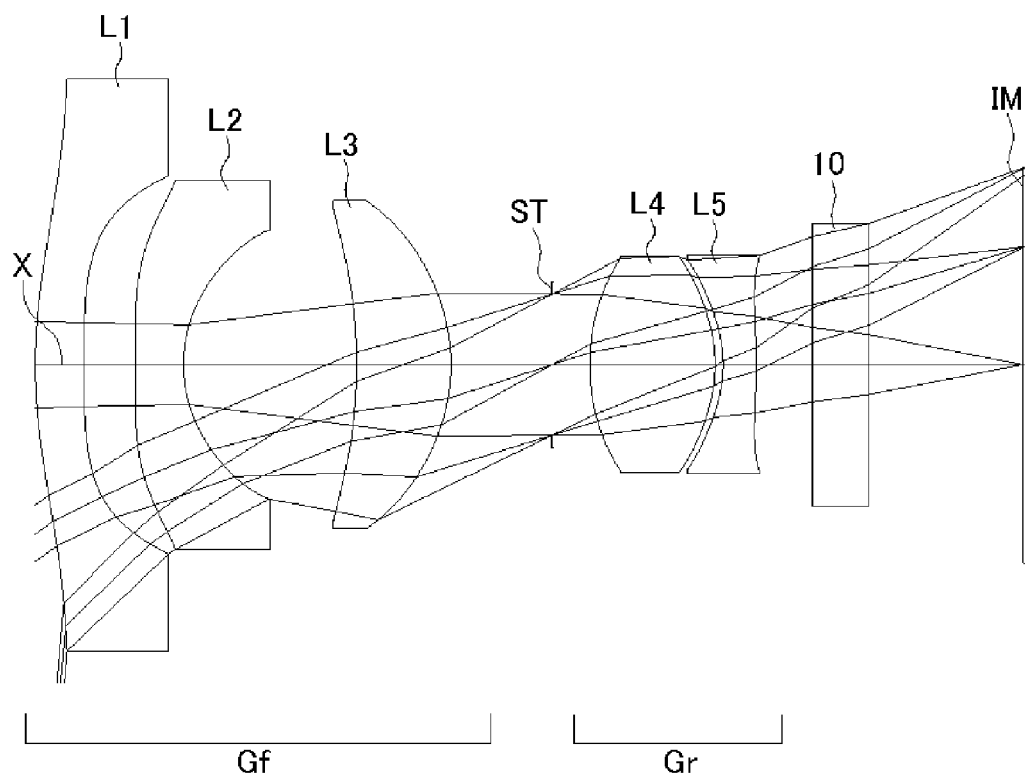
FIG. 10 shows a sectional view of a schematic configuration of an imaging lens in Numerical Data Example 4 according to the embodiment of the invention.

FIG. 8 shows a lateral aberration that corresponds to a half angle of view ω, and FIG. 9 shows a spherical aberration (mm), astigmatism (mm), and a distortion (%), respectively in the imaging lens of Numerical Data Example 3. As shown in FIGS. 8 and 9, according to the imaging lens of Numerical Data Example 3, the aberrations are also satisfactorily corrected.

Numerical Data Example 4

Basic data are shown below.
f = 2.79 mm, Fno = 2.6, ω = 85°
Unit: mm

Surface Data

| Surface Number i | r | d | nd | vd |
|---|---|---|---|---|
| (Object) | ∞ | ∞ | | |
| 1* | 6.607 | 0.600 | 1.535 | 56.1 (=vd1) |
| 2* | 17.743 | 0.640 | | |
| 3* | −181.316 | 0.600 | 1.535 | 56.1 (=vd2) |
| 4* | 1.759 | 2.152 | | |
| 5* | −6.764 | 1.174 | 1.535 | 56.1 (=vd3) |
| 6* | −2.383 | 1.259 | | |
| 7 (Stop) | ∞ | 0.466 | | |
| 8* | 2.631 | 1.556 | 1.535 | 56.1 (=vd4) |
| 9* | −1.886 | 0.100 | | |
| 10* | −1.632 | 0.413 | 1.614 | 26.0 (=vd5) |
| 11* | −7.979 | 0.700 | | |
| 12 | ∞ | 0.700 | 1.517 | 64.1 |
| 13 | ∞ | 1.921 | | |
| (Image plane) | ∞ | | | |

Ff = 29.38 mm
Fr = 4.98 mm
f1 = 19.31 mm
f2 = −3.25 mm
f3 = 6.29 mm
f4 = 2.33 mm
f5 = −3.43 mm
La = 12.04 mm

Basic data are shown below.
f = 2.79 mm, Fno = 2.6, ω = 85°
Unit: mm

Aspheric Surface Data

First Surface
k = 0.000, $A_4$ = −5.650E−03, $A_6$ = 1.290E−04
Second Surface
k = 0.000, $A_4$ = 1.315E−02, $A_6$ = 2.930E−03
Third Surface
k = 0.000, $A_4$ = 3.840E−02, $A_6$ = −3.755E−03
Fourth Surface
k = 0.000, $A_4$ = 2.571E−03, $A_6$ = −7.844E−03
Fifth Surface
k = 0.000, $A_4$ = −5.090E−03, $A_6$ = 1.302E−03
Sixth Surface
k = 0.000, $A_4$ = 6.984E−03, $A_6$ = −3.398E−04
Eighth Surface
k = 0.000, $A_4$ = 7.993E−03, $A_6$ = −2.742E−04
Ninth Surface
k = 0.000, $A_4$ = 4.508E−02, $A_6$ = −4.936E−03
Tenth Surface
k = 0.000, $A_4$ = 7.993E−02, $A_6$ = −4.497E−03
Eleventh Surface
k = 0.000, $A_4$ = 4.021E−02, $A_6$ = 4.511E−03

The values of the respective conditional expressions are as follows:

$f1/f = 6.92$ $|f1/f2| = 5.94$ $Ff/f = 10.53$ $Fr/f = 1.78$

Accordingly, the imaging lens of Numerical Data Example 4 satisfies the above-described conditional expressions. A sum of surface spacing La on the optical axis from the object-side surface of the first lens L1 to the image plane IM is 12.04 mm, and downsizing of the imaging lens is attained.

Figure 11:
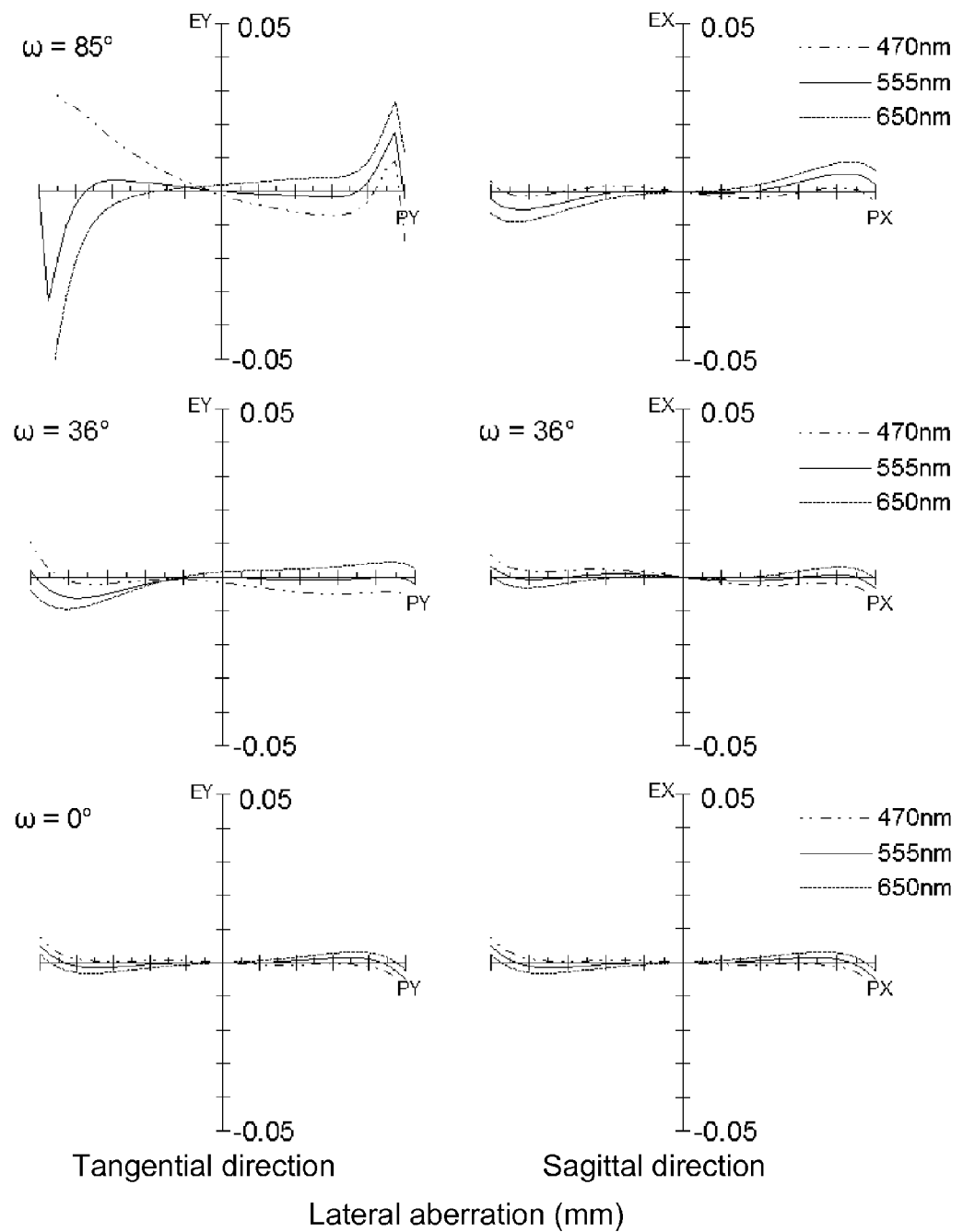
FIG. 11 is an aberration diagram showing a lateral aberration of the imaging lens of FIG. 10.
Figure 12:
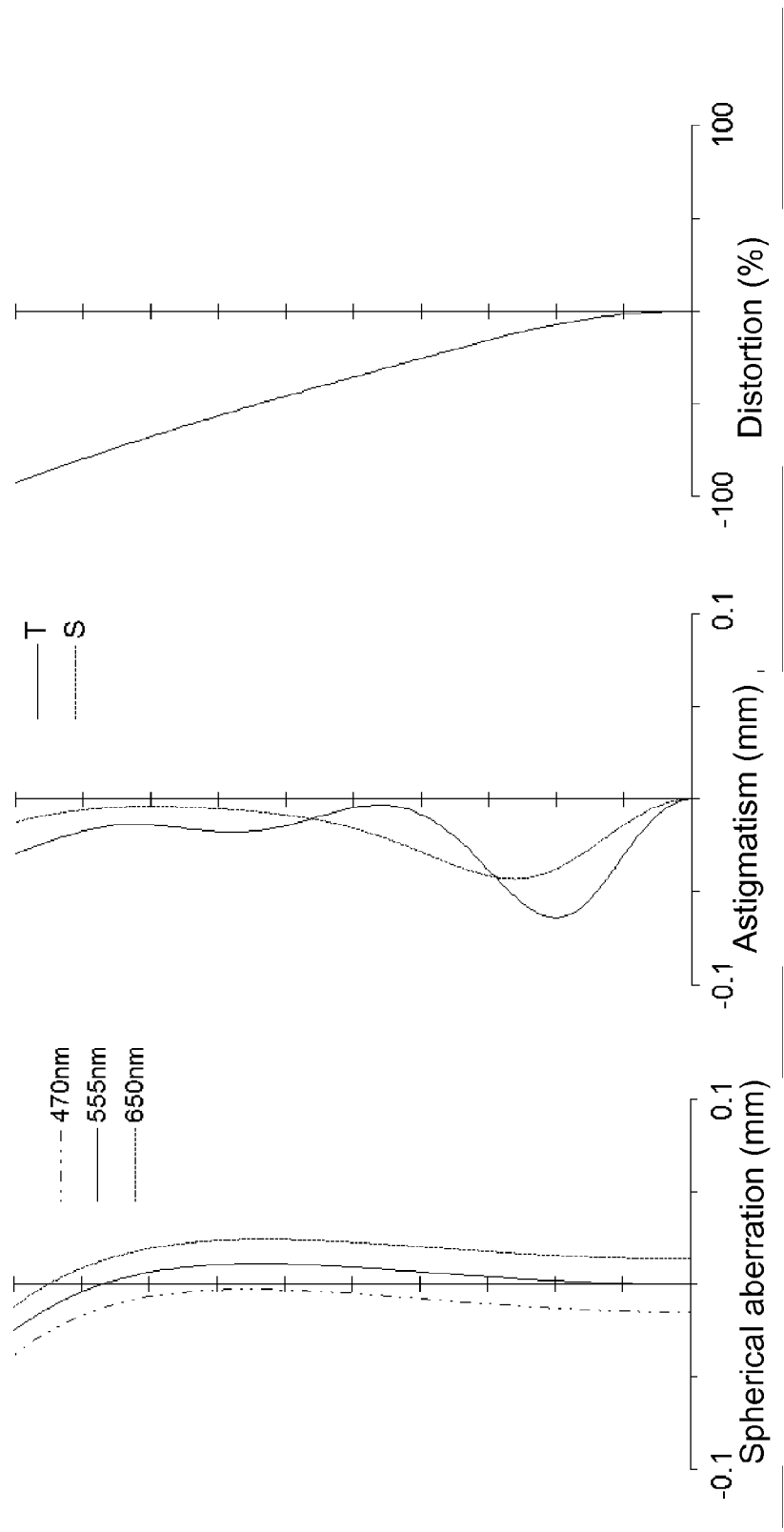
FIG. 12 is an aberration diagram showing a spherical aberration, astigmatism, and a distortion of the imaging lens of FIG. 10.
Figure 13:
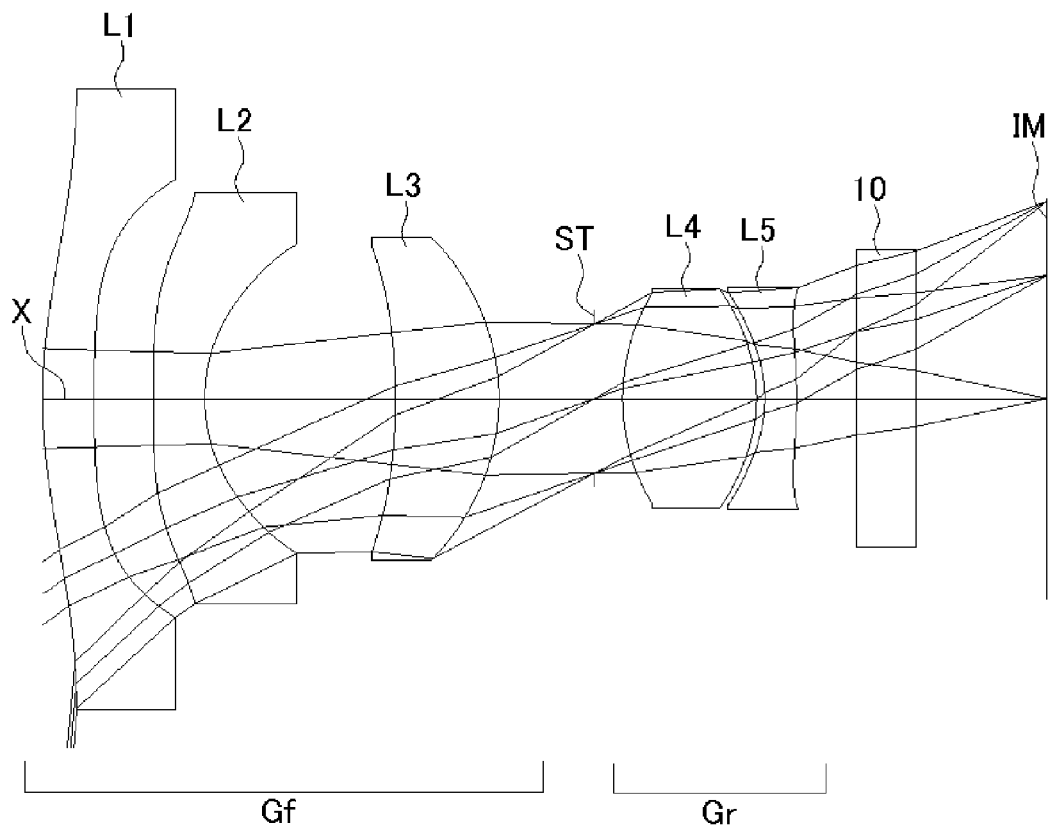
FIG. 13 shows a sectional view of a schematic configuration of an imaging lens in Numerical Data Example 5 according to the embodiment of the invention.

FIG. 11 shows a lateral aberration that corresponds to a half angle of view ω, and FIG. 12 shows a spherical aberration (mm), astigmatism (mm), and a distortion (%), respectively in the imaging lens of Numerical Data Example 4. As shown in FIGS. 11 and 12, according to the imaging lens of Numerical Data Example 4, the aberrations are also satisfactorily corrected.

Numerical Data Example 5

Basic data are shown below.
f = 2.81 mm, Fno = 2.4, ω = 85°
Unit: mm

Surface Data

| Surface Number i | r | d | nd | vd |
|---|---|---|---|---|
| (Object) | ∞ | ∞ | | |
| 1* | 6.246 | 0.600 | 1.531 | 56.0 (=vd1) |
| 2* | 19.624 | 0.694 | | |
| 3* | 92.599 | 0.600 | 1.531 | 56.0 (=vd2) |
| 4* | 1.957 | 2.227 | | |
| 5* | −7.330 | 1.212 | 1.531 | 56.0 (=vd3) |
| 6* | −2.483 | 1.117 | | |
| 7 (Stop) | ∞ | 0.328 | | |
| 8* | 2.502 | 1.561 | 1.531 | 56.0 (=vd4) |
| 9* | −1.902 | 0.100 | | |
| 10* | −1.585 | 0.370 | 1.634 | 23.9 (=vd5) |
| 11* | −5.886 | 0.700 | | |
| 12 | ∞ | 0.700 | 1.517 | 64.1 |
| 13 | ∞ | 1.529 | | |
| (Image plane) | ∞ | | | |

Ff = 19.85 mm
Fr = 4.73 mm
f1 = 16.99 mm
f2 = −3.77 mm
f3 = 6.51 mm
f4 = 2.32 mm
f5 = −3.54 mm
La = 11.50 mm

Aspheric Surface Data

First Surface
k = 0.000, $A_4$ = −6.122E−03, $A_6$ = 1.325E−04
Second Surface
k = 0.000, $A_4$ = 1.089E−02, $A_6$ = 1.092E−03
Third Surface
k = 0.000, $A_4$ = 3.432E−02, $A_6$ = −3.574E−03
Fourth Surface
k = 0.000, $A_4$ = 1.645E−02, $A_6$ = −8.742E−03
Fifth Surface
k = 0.000, $A_4$ = −6.754E−03, $A_6$ = 5.487E−04
Sixth Surface
k = 0.000, $A_4$ = 6.659E−03, $A_6$ = −1.220E−04
Eighth Surface
k = 0.000, $A_4$ = 1.369E−02, $A_6$ = −3.183E−03
Ninth Surface
k = 0.000, $A_4$ = 3.005E−02, $A_6$ = −3.680E−03
Tenth Surface
k = 0.000, $A_4$ = 6.832E−02, $A_6$ = 2.619E−03
Eleventh Surface
k = 0.000, $A_4$ = 4.299E−02, $A_6$ = 8.764E−03

The values of the respective conditional expressions are as follows:

$f1/f = 6.05$ $|f1/f2| = 4.51$ $Ff/f = 7.06$ $Fr/f = 1.68$

Accordingly, the imaging lens of Numerical Data Example 5 satisfies the above-described conditional expressions. A sum of surface spacing La on the optical axis from the object-side surface of the first lens L1 to the image plane IM is 11.50 mm, and downsizing of the imaging lens is attained.

Figure 14:
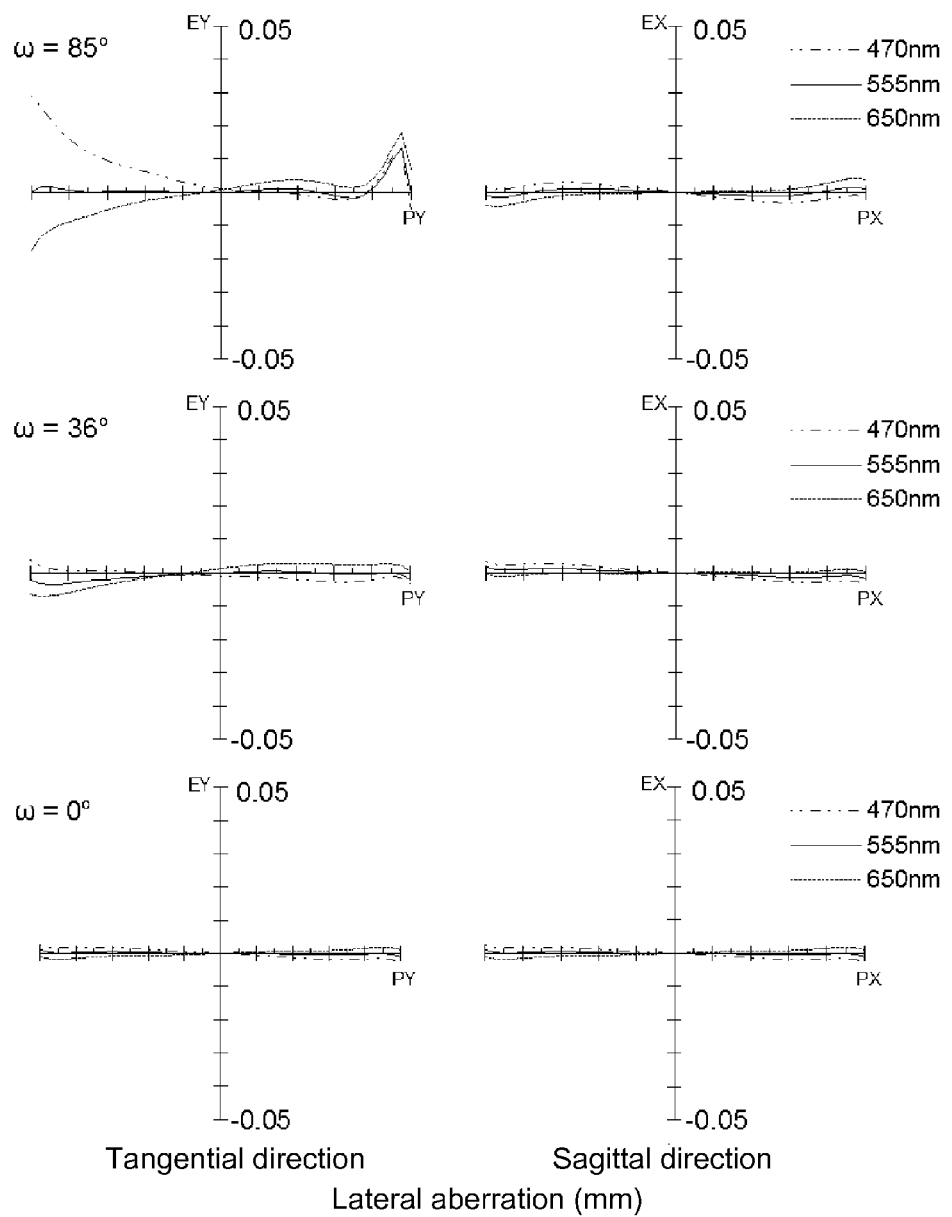
FIG. 14 is an aberration diagram showing a lateral aberration of the imaging lens of FIG. 13.
Figure 15:
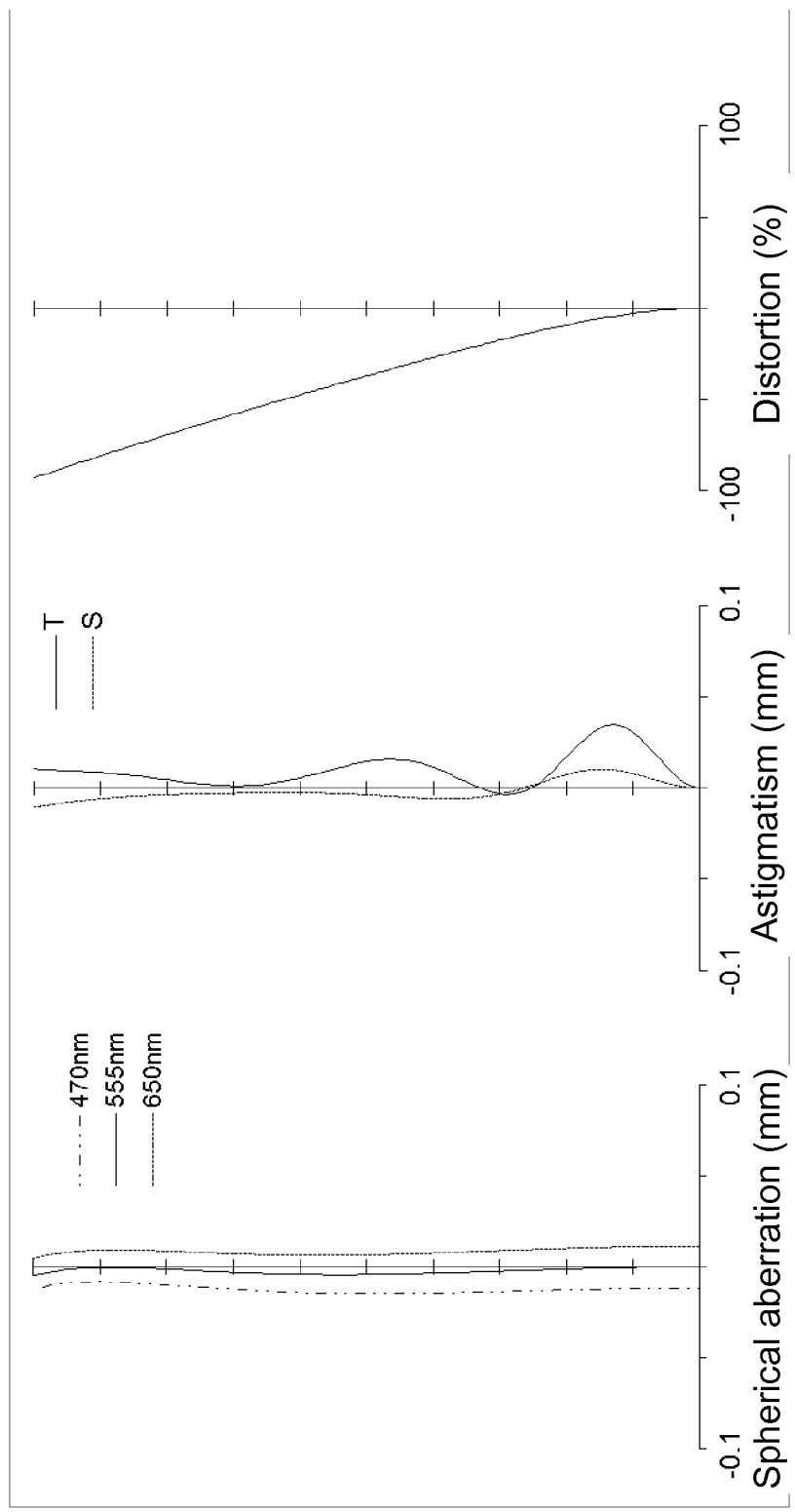
FIG. 15 is an aberration diagram showing a spherical aberration, astigmatism, and a distortion of the imaging lens of FIG. 13.

FIG. 14 shows a lateral aberration that corresponds to a half angle of view ω, and FIG. 15 shows a spherical aberration (mm), astigmatism (mm), and a distortion (%), respectively in the imaging lens of Numerical Data Example 5. As shown in FIGS. 14 and 15, according to the imaging lens of Numerical Data Example 5, the aberrations are also satisfactorily corrected.

As described above, according to the imaging lens of the embodiment, it is achievable to obtain an angle of view (2ω) of 130° or larger. The angles of view of the imaging lenses in Numerical Data Examples 1 to 5 are as wide as 138° to 170°.

Here, in the above-described Numerical Data Examples, each lens surface is formed as an aspheric surface, but where there is some flexibility in the total length of the imaging lens or required optical performances, a part of the lens surfaces that compose the imaging lens can be formed as spherical surfaces.

Therefore, when the imaging lens of the embodiment is applied in an imaging optical system of cellular phones, digital still cameras, portable information terminals, security cameras, onboard cameras, network cameras, etc., it is possible to provide a small-sized camera with satisfactorily corrected aberrations in spite of a wide angle thereof.

The present invention may be applied in a device that requires satisfactory aberration correcting performance as well as a wide imaging angle of view as an imaging lens, for example in an imaging lens for mounting in devices such as cellular phones, security cameras, and onboard cameras.

The disclosure of Japanese Patent Application No. 2013-038345, filed on Feb. 28, 2013, is incorporated in the application by reference.

While the present invention has been explained with reference to the specific embodiments of the present invention, the explanation is illustrative and the present invention is limited only by the appended claims.

What is claimed is:

1. An imaging lens comprising:
an object-side lens group having positive refractive power; an aperture stop; and
an image plane-side lens group having positive refractive power, arranged in this order from an object side to an image plane side,
wherein said object-side lens group includes a first lens having positive refractive power; a second lens having negative refractive power; and a third lens having positive refractive power,
said image plane-side lens group includes a fourth lens having positive refractive power; and a fifth lens having negative refractive power,
said first lens is formed in an aspheric shape so as to have negative refractive power increasing toward a lens periphery thereof from an optical axis thereof, and has a surface on the object side having a positive curvature radius, and
said first lens has a focal length f1, said second lens has a focal length f2, said third lens has a focal length f3, said first lens has an Abbe's number vd1, said second lens has an Abbe's number vd2, said third lens has an Abbe's number vd3, said fourth lens has an Abbe's number vd4, and said fifth lens has an Abbe's number vd5 so that the following conditional expressions are satisfied:

$|f2|<f1$ and $|f2|<f3$ $40<vd1<70$ $40<vd2<70$ $40<vd3<70$ $40<vd4<70$ $20<vd5<35.$ 2. The imaging lens according to claim 1, wherein said second lens is formed in an aspheric shape having refractive power increasing toward a lens periphery thereof from an optical axis thereof,
said second lens has a surface on the image plane side having a positive curvature radius, and
said third lens has a surface on the object side and a surface on the image plane side having negative curvature radii.

3. The imaging lens according to claim 1, wherein said fourth lens has a surface on the object side having a positive curvature radius and a surface on the image plane side having a negative curvature radius, and
said fifth lens has a surface on the object side and a surface on the image plane side having negative curvature radii.

4. The imaging lens according to claim 1, wherein said first lens has the focal length f1 so that the following conditional expression is satisfied:

$1.5<f1/f<7$ where f is a focal length of a whole lens system.

5. The imaging lens according to claim 1, wherein said first lens has the focal length f1 and said second lens has the focal length f2 so that the following conditional expression is satisfied:

$2<f1/|f2|<8.$

6. The imaging lens according to claim 1, wherein said object-side lens group has a focal length Ff so that the following conditional expression is satisfied:

$5<Ff/f<12$ where f is a focal length of a whole lens system.

7. The imaging lens according to claim 1, wherein said image plane-side lens group has a focal length Fr so that the following conditional expression is satisfied:

$0.5<Fr/f<2.5$ where f is a focal length of a whole lens system.

8. An imaging lens comprising:
an object-side lens group having positive refractive power; an aperture stop; and
an image plane-side lens group having positive refractive power, arranged in this order from an object side to an image plane side,
wherein said object-side lens group includes a first lens having positive refractive power, a second lens, and a third lens, and
said first lens has a focal length f1, said second lens has a focal length f2, said third lens has a focal length f3 and an angle of view 2ω so that the following conditional expressions are satisfied:

$|f2|<f1$ and $|f2|<f3$ $130°≤2\omega.$

9. The imaging lens according to claim 8, wherein said image plane-side lens group includes a fourth lens having positive refractive power and a fifth lens having negative refractive power.

10. The imaging lens according to claim 9, wherein said first lens has an Abbe's number vd1, said second lens has an Abbe's number vd2, said third lens has an Abbe's number vd3, said fourth lens has an Abbe's number vd4, and said fifth lens has an Abbe's number vd5 so that the following conditional expressions are satisfied:

$40<vd1<70$ $40<vd2<70$ $40<vd3<70$ $40<vd4<70$ $20<vd5<35.$

11. The imaging lens according to claim 8, wherein said second lens is formed in an aspheric shape so as to have refractive power increasing toward a lens periphery thereof from an optical axis thereof, and has a surface on the image plane side having a positive curvature radius, and said third lens has a surface on the object side and a surface on the image plane side having negative curvature radii.

12. The imaging lens according to claim 8, wherein said fourth lens has a surface on the object side having a positive curvature radius and a surface on the image plane side having a negative curvature radius, and said fifth lens has a surface on the object side and a surface on the image plane side having negative curvature radii.

13. The imaging lens according to claim 8, wherein said first lens has the focal length f1 so that the following conditional expression is satisfied:

$$1.5 < f1/f < 7$$

where f is a focal length of a whole lens system.

14. The imaging lens according to claim 8, wherein said first lens has the focal length f1 and said second lens has the focal length f2 so that the following conditional expression is satisfied:

$$2 < f1/|f2| < 8.$$

15. The imaging lens according to claim 8, wherein said object-side lens group has a focal length Ff so that the following conditional expression is satisfied:

$$5 < Ff/f < 12$$

where f is a focal length of a whole lens system.

16. The imaging lens according to claim 8, wherein said image plane-side lens group has a focal length Fr so that the following conditional expression is satisfied:

$$0.5 < Fr/f < 2.5$$

where f is a focal length of a whole lens system.

\* \* \* \* \*